United States Patent
Adams et al.

(10) Patent No.: US 8,103,735 B2
(45) Date of Patent: Jan. 24, 2012

(54) METHOD AND SYSTEM FOR GENERATING TEMPLATE REPLIES TO ELECTRONIC MAIL MESSAGES

(75) Inventors: Neil Adams, Waterloo (CA); Raymond Vander Veen, Waterloo (CA)

(73) Assignee: Research in Motion Limited, Waterloo, Ontario (CA)

( * ) Notice: Subject to any disclaimer, the term of this patent is extended or adjusted under 35 U.S.C. 154(b) by 0 days.

(21) Appl. No.: 13/212,295

(22) Filed: Aug. 18, 2011

(65) Prior Publication Data

US 2011/0302261 A1 Dec. 8, 2011

Related U.S. Application Data

(63) Continuation of application No. 12/552,496, filed on Sep. 2, 2009, now Pat. No. 8,024,414, which is a continuation of application No. 11/265,297, filed on Nov. 3, 2005, now Pat. No. 7,603,424.

(51) Int. Cl.
G06F 15/16 (2006.01)

(52) U.S. Cl. ........................................ 709/206; 709/217

(58) Field of Classification Search .......... 709/200–203, 709/206, 217–227
See application file for complete search history.

(56) References Cited

U.S. PATENT DOCUMENTS

| | | | |
|---|---|---|---|
| 6,085,201 A | 7/2000 | Tso | |
| 6,382,565 B1 * | 5/2002 | Fowell | 244/165 |
| 6,510,453 B1 | 1/2003 | Apfel et al. | |
| 6,542,923 B2 | 4/2003 | Nguyen | |
| 6,760,727 B1 * | 7/2004 | Schroeder et al. | 1/1 |
| 6,816,885 B1 | 11/2004 | Raghunandan | |
| 6,826,596 B1 | 11/2004 | Suzuki | |
| 6,895,257 B2 * | 5/2005 | Boman et al. | 455/556.1 |
| 6,901,364 B2 * | 5/2005 | Nguyen et al. | 704/235 |
| 6,920,564 B2 | 7/2005 | Decuir | |
| 6,934,905 B1 | 8/2005 | Tighe | |
| 6,941,304 B2 | 9/2005 | Gainey et al. | |
| 7,167,728 B1 | 1/2007 | Wagner et al. | |
| 7,228,121 B2 | 6/2007 | Kennedy | |
| 7,251,677 B1 | 7/2007 | Nguyen | |
| 7,251,679 B1 | 7/2007 | Nguyen | |

(Continued)

FOREIGN PATENT DOCUMENTS

WO 03063128 A2 7/2003

(Continued)

OTHER PUBLICATIONS

Weng et al.: "Using text classification and multiple concepts to answer e-mails" Expert Systems With Applications, Oxford GB, vol. 26, No. 4, May 2004, pp. 529-543.

(Continued)

Primary Examiner — Moustafa M Meky
(74) Attorney, Agent, or Firm — Norton Rose

(57) ABSTRACT

A method for responding to an electronic mail ("email") message presented to a user on a display screen of a data processing system, comprising: receiving a command from the user to generate a reply to the email message using content from one or more template replies, the reply having a subject line and a body; presenting a choice of the one or more template replies to the user; receiving a command to select a template reply from the choice, the template reply having a subject line and a body; and generating the reply by inserting content from the body of the template reply into the body of the reply.

18 Claims, 9 Drawing Sheets

U.S. PATENT DOCUMENTS

| | | | |
|---|---|---|---|
| 7,269,621 | B2 | 9/2007 | Chang et al. |
| 7,293,064 | B1 | 11/2007 | Lundy et al. |
| 7,293,074 | B1 | 11/2007 | Jellinek et al. |
| 7,315,880 | B2 | 1/2008 | Chang et al. |
| 7,360,151 | B1 * | 4/2008 | Froloff .................. 715/255 |
| 7,406,504 | B2 | 7/2008 | Paul |
| 7,487,223 | B2 | 2/2009 | Kiyohara |
| 7,603,424 | B2 | 10/2009 | Adams et al. |
| 2002/0010000 | A1 | 1/2002 | Chern et al. |
| 2002/0026435 | A1 | 2/2002 | Wyss et al. |
| 2002/0087646 | A1 | 7/2002 | Hickey et al. |
| 2002/0099681 | A1 | 7/2002 | Gainey et al. |
| 2002/0129275 | A1 | 9/2002 | Decuir |
| 2005/0066005 | A1 | 3/2005 | Paul |
| 2005/0182954 | A1 | 8/2005 | Decuir |
| 2005/0228774 | A1 | 10/2005 | Ronnewinkel |
| 2005/0228790 | A1 | 10/2005 | Ronnewinkel et al. |
| 2005/0229150 | A1 | 10/2005 | Ronnewinkel |
| 2006/0240395 | A1 | 10/2006 | Faist et al. |
| 2008/0235344 | A1 | 9/2008 | Paul |

FOREIGN PATENT DOCUMENTS

| | | |
|---|---|---|
| WO | 2005036429 A | 4/2005 |

OTHER PUBLICATIONS

Meky, Moustafa M., Office Communication issued in respect of U.S. Appl. No. 12/552,496, dated Aug. 19, 2010.
Ogilvy Renault, Response to Office Communication issued in respect of U.S. Appl. No. 12/552,496, dated Nov. 18, 2010.
Meky, Moustafa M., Office Communication issued in respect of U.S. Appl. No. 12/552,496, dated Jan. 27, 2011.
Ogilvy Renault, Response to Office Communication issued in respect of U.S. Appl. No. 12/552,496, dated Apr. 26, 2011.
Meky, Moustafa M., Office Communication issued in respect of U.S. Appl. No. 12/552,496, dated May 18, 2011.
Canadian Intellectual Property Office, Office Communication issued in respect of Canadian Patent Application No. 2,566,994, dated Apr. 16, 2010.
Ogilvy Renault, Response to Office Communication issued in respect of Canadian Patent Application No. 2,566,994, dated Sep. 14, 2010.
Canadian Intellectual Property Office, Office Communication issued in respect of Canadian Patent Application No. 2,566,994, dated Jul. 7, 2011.
Meky, Moustafa M., Office Communication issued in respect of U.S. Appl. No. 11/265,297, dated Jun. 20, 2008.
Ogilvy Renault, Response to Office Communication issued in respect of U.S. Appl. No. 11/265,297, dated Sep. 19, 2008.
Meky, Moustafa M., Office Communication issued in respect of U.S. Appl. No. 11/265,297, dated Dec. 3, 2008.
Ogilvy Renault, Response to Office Communication issued in respect of U.S. Appl. No. 11/265,297, dated Apr. 3, 2009.
Meky, Moustafa M., Office Communication issued in respect of U.S. Appl. No. 11/265,297, dated Jun. 2, 2009.
Trachtenberg et al., Fast PDA Synchronization Using Characteristic Polynomial Interpolation, Proceedings of the IEEE INFOCOM Conference on Computer Communications, XP010593713, Jun. 23, 2002.
Weng et al.: "Using text classification and multiple concepts to answer e-mails" Expert Systems With Applications, Oxford, GB, vol. 26, No. 4 May 2004, pp. 529-543.
XP005084045 ISSN: 0957-4174.

* cited by examiner

400

410 {
420 — From: John
Sent: February 23, 2005
To: Jane
Subject:

430 — Dear Jane:

Is there a list of backdoors on the device? If so, where is it located?

Best Regards,

John

Subject:

810 —{ Location of Backdoors

Body: ——————— 830

820 {
Hi %r,

The backdoor list is located in livelink at:

http://insiderim/livelink/xxxxx

Jane

METHOD AND SYSTEM FOR GENERATING TEMPLATE REPLIES TO ELECTRONIC MAIL MESSAGES

CROSS-REFERENCE TO RELATED APPLICATIONS

This application is a continuation of U.S. patent application Ser. No. 11/265,297, filed Nov. 3, 2005 and of U.S. patent application Ser. No. 12/552,496 filed Sep. 2, 2009, the entirety of each of which is hereby incorporated by reference.

FIELD OF THE APPLICATION

This application relates to the field of electronic mail ("email") messages, and more specifically, to generating template replies for email messages received by wireless and other devices.

BACKGROUND

Current wireless mobile communication devices include microprocessors, memory, soundcards, and run one or more software applications. Examples of software applications used in these wireless devices include micro-browsers, address books, email clients, instant messaging ("IM") clients, and wavetable instruments. Additionally, wireless devices have access to a plurality of services via the Internet. A wireless device may, for example, be used to browse web sites on the Internet, to transmit and receive graphics, and to execute streaming audio and/or video applications. The transfer of Internet content to and from wireless device is typically facilitated by the Wireless Application Protocol ("WAP"), which integrates the Internet and other networks with wireless network platforms.

With respect to email messages, a message may contain a common or frequently asked question ("FAQ"). When a second user receives a FAQ from a first user via email, the second user will typically have to enter a standard response that has been entered in response to the same FAQ many times previously. This can be a time consuming and frustrating process for the second user especially if the FAQ has been posed by several users or if the standard reply to the FAQ is a long one or requires research to find the answer. Examples of FAQs include the following: "Is there a list of backdoors on the device? If so where is it located?"; "Why does your email message show up as having an invalid certificate?"; and "How can I load SMIME onto my device?"

One solution for the second user is to establish a FAQ web page or site that contains a list of FAQs and responses. The second user may then provide a link to the first user to direct the first user to the FAQ web page. However, there are several problems with this solution. First, some users consider that responding to an email with a link to a FAQ web page is not very tactful as it implies a sentiment which may be expressed as follows: "You are the 100th person to email this question to me and I can't be bothered to respond to it anymore". Second, users still have to remember the FAQ web page link. Third, the information for the FAQ web page has to be stored in a convenient location where both internal and external users can have access to it. However, it is time consuming to find and maintain a location where this information can be stored. A user's company could create a common location and easy to use web interface for updating the FAQ information, but this would simply shift the burden to the company rather than actually saving time. In addition, it can be time consuming for users to input and retrieve information from a company run site.

Therefore, one shortcoming of present wireless and other devices is their inability to effectively generate responses to FAQs received by email. Furthermore, the need to effectively generate responses to FAQs is increasing in importance with the increase in the number of email related applications being run on wireless and other devices.

A need therefore exists for an effective method and system for generating replies to FAQs received by email messages in wireless and other devices. Accordingly, a solution that addresses, at least in part, the above and other shortcomings is desired.

BRIEF DESCRIPTION OF THE DRAWINGS

Further features and advantages of the embodiments of the present application will become apparent from the following detailed description, taken in combination with the appended drawings, in which:

FIG. 4 is a partial screen capture illustrating the content of an exemplary opened email message;

FIG. 8 is a partial screen capture illustrating the content of an exemplary template reply in accordance with an embodiment of the application.

It will be noted that throughout the appended drawings, like features are identified by like reference numerals.

DETAILED DESCRIPTION OF THE PREFERRED EMBODIMENTS

Figure 1:
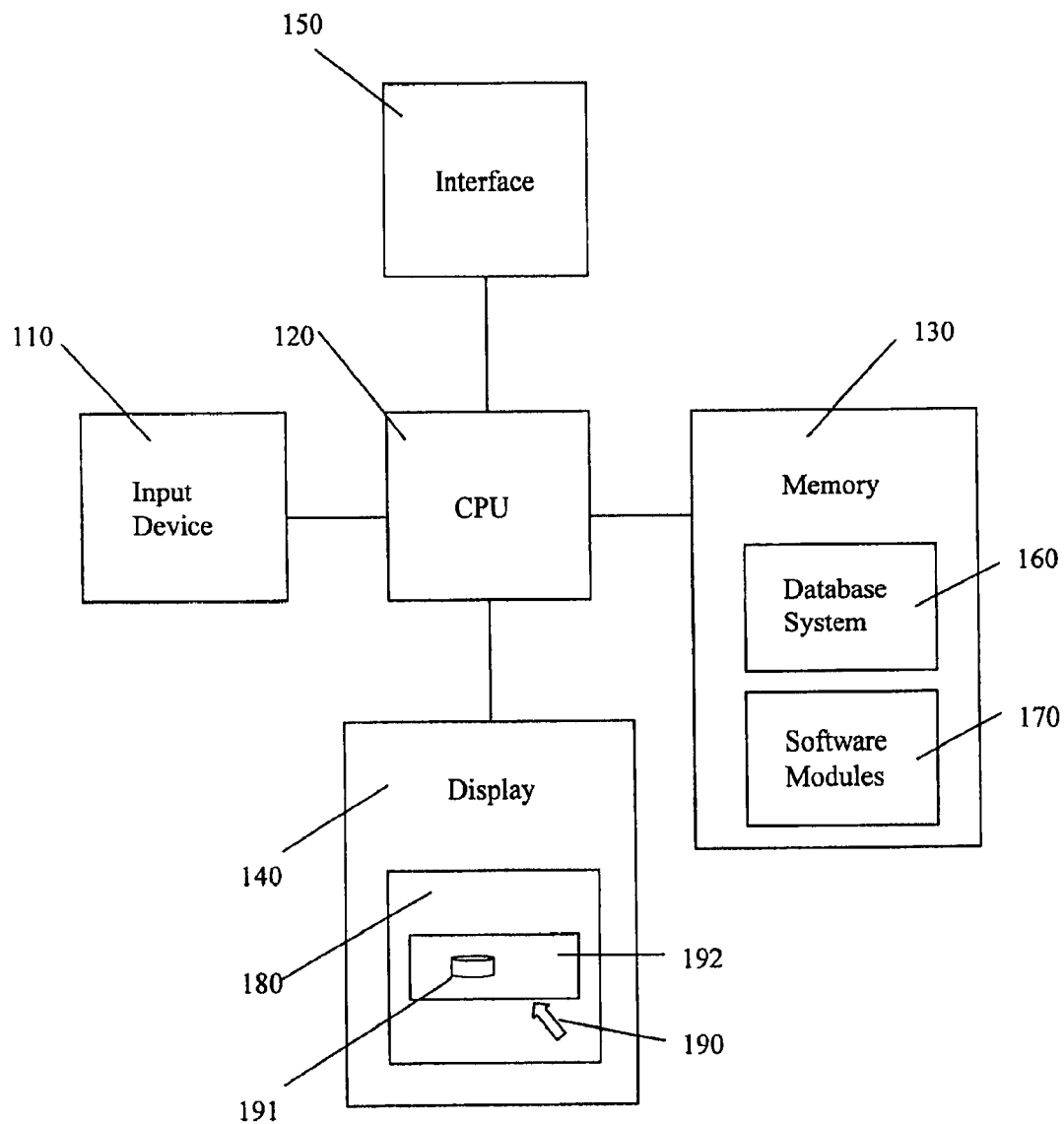
FIG. 1 is a block diagram illustrating a data processing system adapted for implementing an embodiment of the application.

The following detailed description of the embodiments of the present application does not limit the implementation of the application to any particular computer programming language. The present application may be implemented in any computer programming language provided that the operating system ("OS") provides the facilities that may support the requirements of the present application. A preferred embodiment is implemented in the JAVA™ computer programming language (or other computer programming languages such as C or C++). (JAVA and all JAVA-based trademarks are the trademarks of Sun Microsystems Corporation.) Any limitations presented would be a result of a particular type of operating system or computer programming language and would not be a limitation of the present application.

According to one aspect of the application, there is provided a method for responding to an electronic mail ("email") message presented to a user on a display screen of a data processing system, comprising: receiving a command from the user to generate a reply to the email message using content from one or more template replies, the reply having a subject line and a body; presenting a choice of the one or more template replies to the user; receiving a command to select a template reply from the choice, the template reply having a subject line and a body; and generating the reply by inserting content from the body of the template reply into the body of the reply.

Preferably, the generating further comprises: if the subject line of the template reply is not empty, inserting content from the subject line of the template reply into the subject line of the reply. Preferably, the method further includes presenting at least one of a menu item and a button icon on the display screen for selecting by the user to initiate the command to generate the reply. Preferably, the method further includes presenting the reply on the display screen for at least one of review by the user, editing, and sending. Preferably, the method further includes receiving a command from the user to modify the reply by inserting content from a body of a second template reply at a location in the body of the reply selected by the user, the second template reply selected by the user from the choice of the one or more template replies. Preferably, the method further includes receiving a command from the user to at least one of edit, view, delete, and send a copy of one or more of the template replies. Preferably, the method further includes receiving a command from the user to at least one of: add a new template reply to the one or more template replies having content newly entered by the user; add a new template reply to the one or more template replies having content copied from the reply; and add a new template reply to the one or more template replies having content copied from a sent reply. Preferably, the one or more template replies comprises one or more macros. Preferably, the email message is one of a short message system ("SMS") message and a peer-to-peer message. Preferably, the data processing system is a wireless device having a clickable thumbwheel. Preferably, the method further includes opening the email message on the display screen when the email message is selected from a list of email messages by the user with the clickable thumbwheel.

In accordance with further aspects of the present application there is provided an apparatus such as a data processing system or wireless device, a method for adapting this system or device, as well as articles of manufacture such as a computer readable medium having program instructions recorded thereon for practising the method of the application.

FIG. 1 is a block diagram illustrating a data processing system 100 adapted for implementing an embodiment of the application. The data processing system 100 includes an input device 110, a central processing unit or CPU 120, memory 130, a display 140, and an interface 150. The input device 110 may include a keyboard, mouse, trackball, remote control, or similar device. The CPU 120 may include dedicated coprocessors and memory devices. The memory 130 may include RAM, ROM, or disk devices. The display 140 may include a computer screen, terminal device, or a hardcopy producing output device such as a printer or plotter. And, the interface 150 may include a network connection including an Internet connection and a wireless network 220 connection (see FIG. 2). The data processing system 100 is adapted for communicating with wireless devices 210 over a wireless network 220.

The data processing system 100 may be a server system or a personal computer ("PC") system. The CPU 120 of the system 100 is operatively coupled to memory 130 which stores an operating system (not shown), such as IBM Corporation's OS/2™, UNIX, etc., for general management of the system 100. The interface 150 may be used for communicating to external data processing systems (not shown) through a network (such as the Internet) or wireless network 220 (see FIG. 2). Examples of suitable platforms for the system 100 include iSeries™ servers and ThinkCentre™ personal computers available from IBM Corporation. The system 100 may include application server software (not shown), such as WebLogic® Server available from BEA Systems, Inc., for developing and managing distributed applications.

The data processing system 100 may include a database system 160 for storing and accessing programming information. The database system 160 may include a database management system ("DBMS") and a database and is stored in the memory 130 of the data processing system 100.

The data processing system 100 includes computer executable programmed instructions for directing the system 100 to implement the embodiments of the present application. The programmed instructions may be embodied in one or more software modules 170 resident in the memory 130 of the data processing system 100. Alternatively, the programmed instructions may be embodied on a computer readable medium (such as a CD disk or floppy disk) which may be used for transporting the programmed instructions to the memory 130 of the data processing system 100. Alternatively, the programmed instructions may be embedded in a computer-readable, signal-bearing medium that is uploaded to a network by a vendor or supplier of the programmed instructions, and this signal-bearing medium may be downloaded through the interface 150 to the data processing system 100 from the network by end users or potential buyers.

The CPU 120 of the system 100 is typically coupled to one or more devices 110 for receiving user commands or queries and for displaying the results of these commands or queries to the user on a display 140. As mentioned, the memory 130 may include a variety of storage devices including internal memory and external mass storage typically arranged in a hierarchy of storage as understood to those skilled in the art.

A user may interact with the data processing system 100 and its software modules 170 using a graphical user interface ("GUI") 180. The GUI 180 may be web-based and may be used for monitoring, managing, and accessing the data processing system 100. GUIs are supported by common operating systems and provide a display format which enables a user to choose commands, execute application programs, manage computer files, and perform other functions by selecting pictorial representations known as icons, or items from a menu through use of an input or pointing device such as a mouse 110. In general, a GUI is used to convey information to and receive commands from users and generally includes a variety of GUI objects or controls, including icons, toolbars, drop-down menus, text, dialog boxes, buttons, and the like. A user typically interacts with a GUI 180 presented on a display 140 by using an input or pointing device (e.g., a mouse) 110 to position a pointer or cursor 190 over an object 191 and by "clicking" on the object 191.

Typically, a GUI based system presents application, system status, and other information to the user in "windows" appearing on the display 140. A window 192 is a more or less rectangular area within the display 140 in which a user may view an application or a document. Such a window 192 may be open, closed, displayed full screen, reduced to an icon, increased or reduced in size, or moved to different areas of the display 140. Multiple windows may be displayed simultaneously, such as: windows included within other windows, windows overlapping other windows, or windows tiled within the display area.

Figure 2:
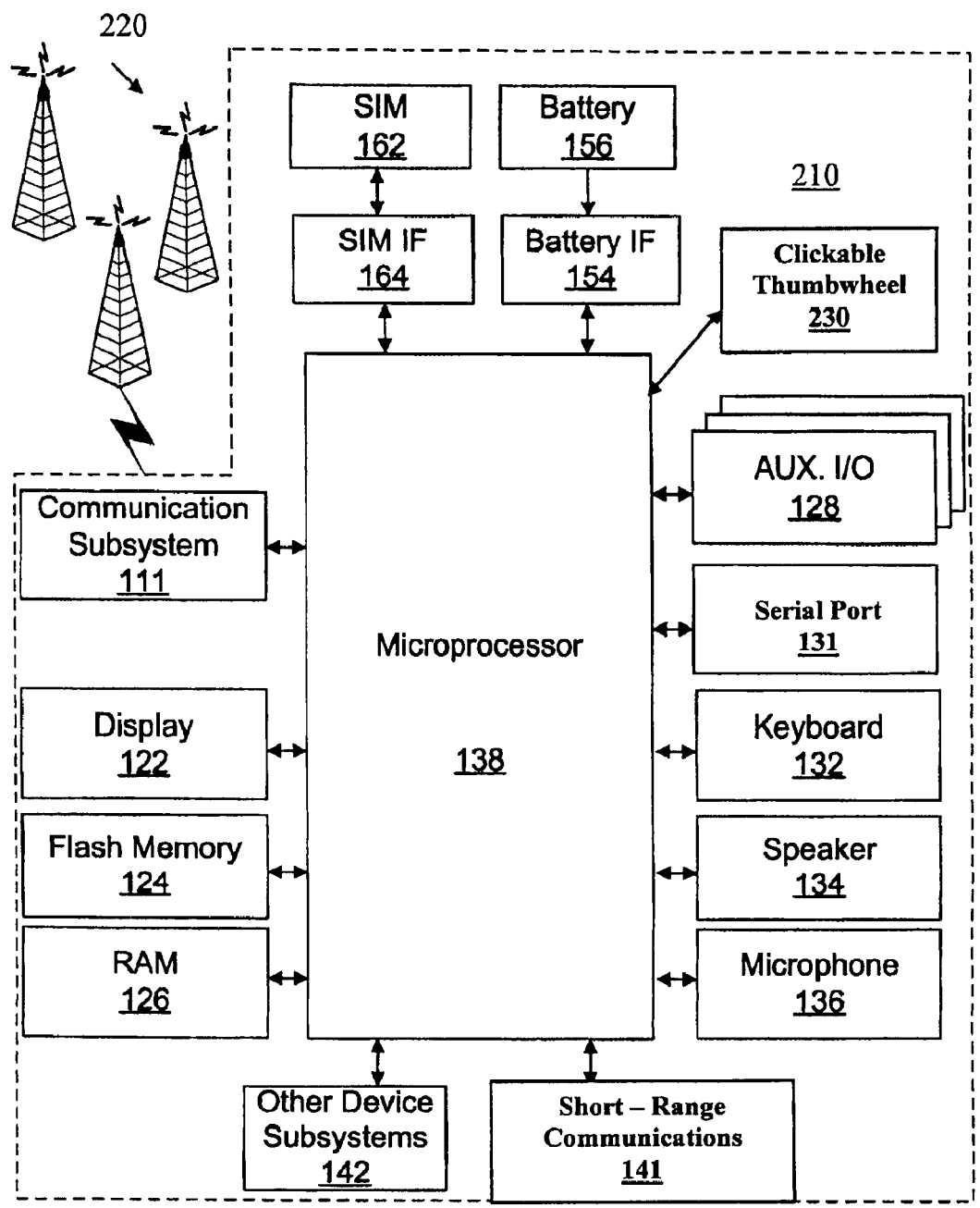
FIG. 2 is a block diagram illustrating a wireless device and a wireless communications system adapted for implementing an embodiment of the application.

FIG. 2 is a block diagram illustrating a wireless device 210 and a wireless network 220 adapted for implementing an embodiment of the application. The wireless network 220 includes antenna, base stations, and supporting radio equipment, known to those of ordinary skill in the art, for supporting wireless communications between the wireless device 210 and the data processing system 100. The wireless network 220 may be coupled to a wireless network gateway (not shown) and to a wide area network (not shown) to which the data processing system 100 may be coupled through its interface 150.

The wireless device 210 is a two-way communication device having at least voice and advanced data communication capabilities, including the capability to communicate with other computer systems 100. Depending on the functionality provided by the device 210, it may be referred to as a data messaging device, a two-way pager, a cellular telephone with data messaging capabilities, a wireless Internet appliance, or a data communication device (with or without telephony capabilities). The device 210 may communicate with any one of a plurality of fixed transceiver stations 220 within its geographic coverage area.

The wireless device 210 will normally incorporate a communication subsystem 111, which includes a RF receiver, a RF transmitter, and associated components, such as one or more (preferably embedded or internal) antenna elements, local oscillators ("LOs"), and a processing module such as a digital signal processor ("DSP") (all not shown). As will be apparent to those skilled in the field of communications, the particular design of the communication subsystem 111 depends on the communication network 220 in which the device 210 is intended to operate.

Network access is associated with a subscriber or user of the device 210 and therefore the device 210 typically has a Subscriber Identity Module (or "SIM" card) 162 to be inserted in a SIM interface ("IF") 164 in order to operate on the network (e.g., a GSM network). The device 210 is a battery-powered device so it also includes a battery IF 154 for receiving one or more rechargeable batteries 156. Such a battery 156 provides electrical power to most if not all electrical circuitry in the device 210, and the battery IF 154 provides for a mechanical and electrical connection for it. The battery IF 154 is coupled to a regulator (not shown) which provides power to the circuitry of the device 210.

The wireless device 210 includes a microprocessor 138 which controls overall operation of the device 210. Communication functions, including at least data and voice communications, are performed through the communication subsystem 111. The microprocessor 138 also interacts with additional device subsystems such as a display 122, a flash memory 124 or other persistent store, a random access memory ("RAM") 126, auxiliary input/output ("I/O") subsystems 128, a serial port 131, a keyboard 132, a clickable thumbwheel 230, a speaker 134, a microphone 136, a short-range communications subsystem 141, and any other device subsystems generally designated at 142. Some of the subsystems shown in FIG. 2 perform communication-related functions, whereas other subsystems may provide "resident" or on-device functions. Notably, some subsystems, such as the keyboard 132, display 122, and clickable thumbwheel 230, for example, may be used for both communication-related functions, such as entering a text message for transmission over a communication network, and device-resident functions such as a calculator or task list. Operating system software used by the microprocessor 138 is preferably stored in a persistent store such as the flash memory 124, which may alternatively be a read-only memory ("ROM") or similar storage element (not shown). Those skilled in the art will appreciate that the operating system, specific device applications, or parts thereof, may be temporarily loaded into a volatile store such as RAM 126.

The microprocessor 138, in addition to its operating system functions, preferably enables execution of software applications on the device 210. A predetermined set of applications which control basic device operations, including at least data and voice communication applications, will normally be installed on the device 210 during its manufacture. A preferred application that may be loaded onto the device 210 may be a personal information manager ("PIM") application having the ability to organize and manage data items relating to the user such as, but not limited to, instant messaging ("IM"), email, calendar events, voice mails, appointments, and task items. Naturally, one or more memory stores are available on the device 210 and SIM 162 to facilitate storage of PIM data items and other information.

The PIM application preferably has the ability to send and receive data items via the wireless network 220. In a preferred embodiment, PIM data items are seamlessly integrated, synchronized, and updated via the wireless network, with the wireless device user's corresponding data items stored and/or associated with a host computer system such as the data processing system 100 thereby creating a mirrored host computer on the device 210 with respect to such items. This is especially advantageous where the host computer system is the wireless device user's office computer system. Additional applications may also be loaded onto the device 210 through the network 220, the auxiliary I/O subsystem 128, the serial port 131, the short-range communications subsystem 141, or any other suitable subsystem 142, and installed by a user in RAM 126 or preferably in a non-volatile store (not shown) for execution by the microprocessor 138. Such flexibility in application installation increases the functionality of the device 210 and may provide enhanced on-device functions, communication-related functions, or both. For example, secure communication applications may enable electronic commerce functions and other such financial transactions to be performed using the wireless device 210.

In a data communication mode, a received signal such as a text message, an email message, or web page download will be processed by the communication subsystem 111 and input to the microprocessor 138. The microprocessor 138 will preferably further process the signal for output to the display 122 and/or to the auxiliary I/O device 128. A user of the wireless device 210 may also compose data items, such as email messages, for example, using the keyboard 132 in conjunction with the display 122, the clickable thumbwheel 230, and possibly the auxiliary I/O device 128. The keyboard 132 is preferably a complete alphanumeric keyboard and/or a telephone-type keypad. These composed items may be transmitted over a communication network 220 through the communication subsystem 111 or the short range communication subsystem 141.

For voice communications, the overall operation of the wireless device 210 is substantially similar, except that the received signals would be output to the speaker 134 and signals for transmission would be generated by the microphone 136. Alternative voice or audio I/O subsystems, such as a voice message recording subsystem, may also be implemented on the device 210. Although voice or audio signal output is preferably accomplished primarily through the speaker 134, the display 122 may also be used to provide, for example, an indication of the identity of a calling party, duration of a voice call, or other voice call related information.

The serial port 131 shown in FIG. 2 is normally implemented in a personal digital assistant ("PDA")-type communication device for which synchronization with a user's desktop computer is a desirable, albeit optional, component. The serial port 131 enables a user to set preferences through an external device or software application and extends the capabilities of the device 210 by providing for information or software downloads to the device 210 other than through a wireless communication network 220. The alternate download path may, for example, be used to load an encryption key onto the device 210 through a direct and thus reliable and trusted connection to thereby provide secure device communication.

The short-range communications subsystem 141 shown in FIG. 2 is an additional optional component which provides for communication between the device 210 and different systems or devices, which need not necessarily be similar devices. For example, the subsystem 141 may include an infrared device and associated circuits and components, or a Bluetooth™ communication module to provide for communication with similarly-enabled systems and devices. (Bluetooth™ is a registered trademark of Bluetooth SIG, Inc.)

Figure 3:
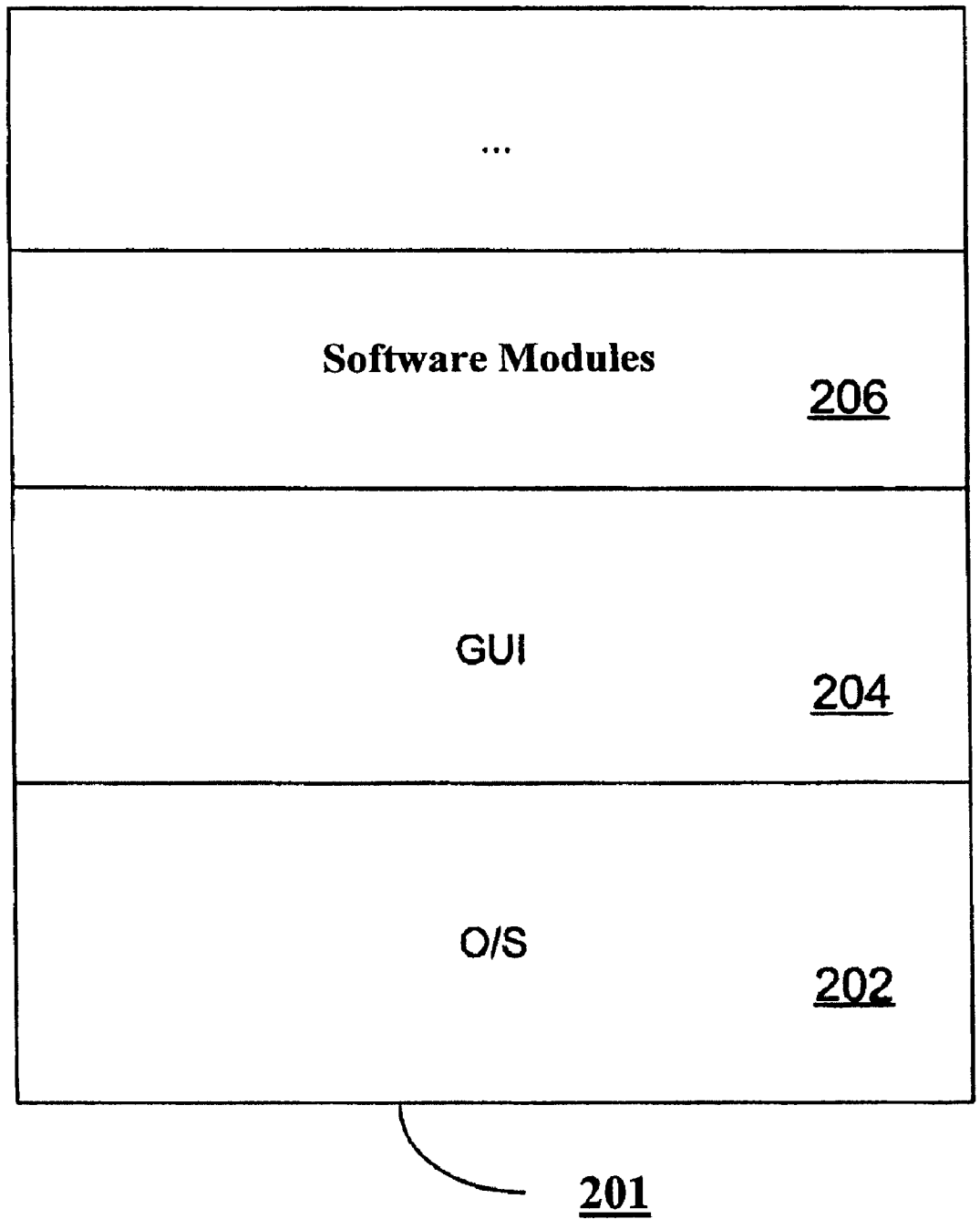
FIG. 3 is a block diagram illustrating a memory of the wireless device of FIG. 2.

FIG. 3 is a block diagram illustrating a memory 201 of the wireless device 210 of FIG. 2. The memory 201 has various software components for controlling the device 210 and may include flash memory 124, RAM 126, or ROM (not shown), for example. In accordance with an embodiment of the application, the wireless device 210 is intended to be a multi-tasking wireless communications device configured for sending and receiving data items and for making and receiving voice calls. To provide a user-friendly environment to control the operation of the device 210, an operating system ("O/S") 202 resident on the device 210 provides a basic set of operations for supporting various applications typically operable through a graphical user interface ("GUI") 204. For example, the O/S 202 provides basic input/output system features to obtain input from the auxiliary I/O 128, the keyboard 132, the clickable thumbwheel 230, and the like, and for facilitating output to the user. In accordance with an embodiment of the application, there are provided software modules 206 for creating and using template replies as will be described below. Though not shown, one or more applications for managing communications or for providing personal digital assistant like functions may also be included.

Thus, the wireless device 210 includes computer executable programmed instructions for directing the device 210 to implement the embodiments of the present application. The programmed instructions may be embodied in one or more software modules 206 resident in the memory 201 of the wireless device 210. Alternatively, the programmed instructions may be embodied on a computer readable medium (such as a CD disk or floppy disk) which may be used for transporting the programmed instructions to the memory of the wireless device 210. Alternatively, the programmed instructions may be embedded in a computer-readable, signal-bearing medium that is uploaded to a network by a vendor or supplier of the programmed instructions, and this signal-bearing medium may be downloaded through an interface 111, 131, 141 to the wireless device 210 from the network by end users or potential buyers.

FIG. 4 is a partial screen capture illustrating the content 410 of an exemplary opened email message 400. The email message 400 is received by a second user ("Jane") from a first user ("John") and is opened by the second user on the display screen 140, 122 of the second user's data processing system 100 or wireless device 210. The content 410 of the email message 400 includes a subject line 420 and a body 430. The body 430 includes a FAQ, for example, "Is there a list of backdoors on the device? If so, where is it located?"

Now, recall the problem described above. When the second user receives a FAQ 430 from a first user via email 400, the second user will typically have to enter a standard response that has been entered in response to the same FAQ many times previously. As mentioned, this can be a time consuming and frustrating process for the second user especially if the FAQ has been posed by several users or if the standard reply to the FAQ is a long one or requires research to find the answer. In general, the present application provides means for generating template replies to FAQs in email messages 400 received by wireless 210 and other devices 100.

According to one embodiment, the template replies are generated by a template replies application 170, 206 that is stored in the memory 130, 201 of the data processing system 100 or wireless device 210. The template replies application may be integrated with the email application run by the data processing system 100 or wireless device 210. With the template replies application 170, 206 a user can create and maintain a FAQ-type list of template replies which can be stored and recalled for later usage in responding to email messages, such as email messages containing FAQs.

Figure 5:
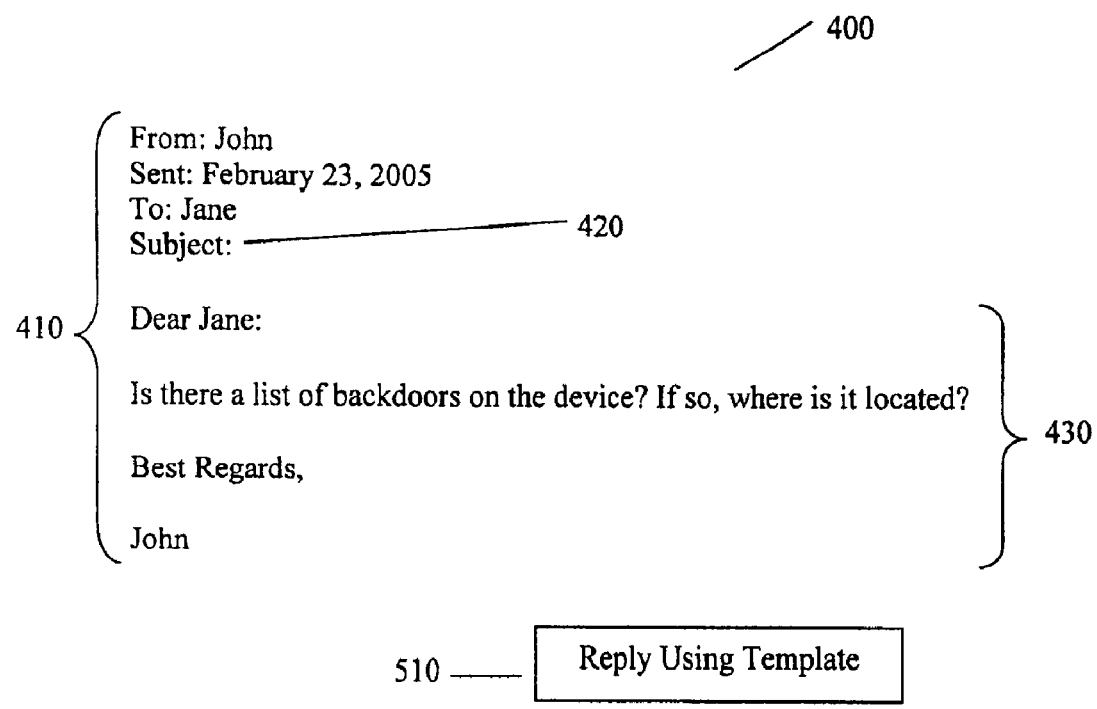
FIG. 5 is a partial screen capture illustrating a graphical user interface ("GUI") element for generating a reply message to the email message of FIG. 4 using a template reply in accordance with an embodiment of the application.

FIG. 5 is a partial screen capture illustrating a graphical user interface ("GUI") element 510 for generating a reply message (see 600 in FIG. 6) to the email message 400 of FIG. 4 using a template reply (see 800 in FIG. 8) in accordance with an embodiment of the application. The GUI element 510 is displayed on the display screen 122, 140 of the wireless device 210 or data processing system 100 and may be incorporated in the GUI 180, 204 associated with email applications 170, 206 running on the wireless device 210 or data processing system 100. The GUI element 510 is a menu item ("Reply Using Template") 510 for generating a reply message 600 to the email message 400 using a template reply 800. The menu item 510 may appear in a pull-down or pop-up menu (not shown). According to one embodiment, the GUI element 510 is a button that may be presented within the email message 400.

Figure 6:
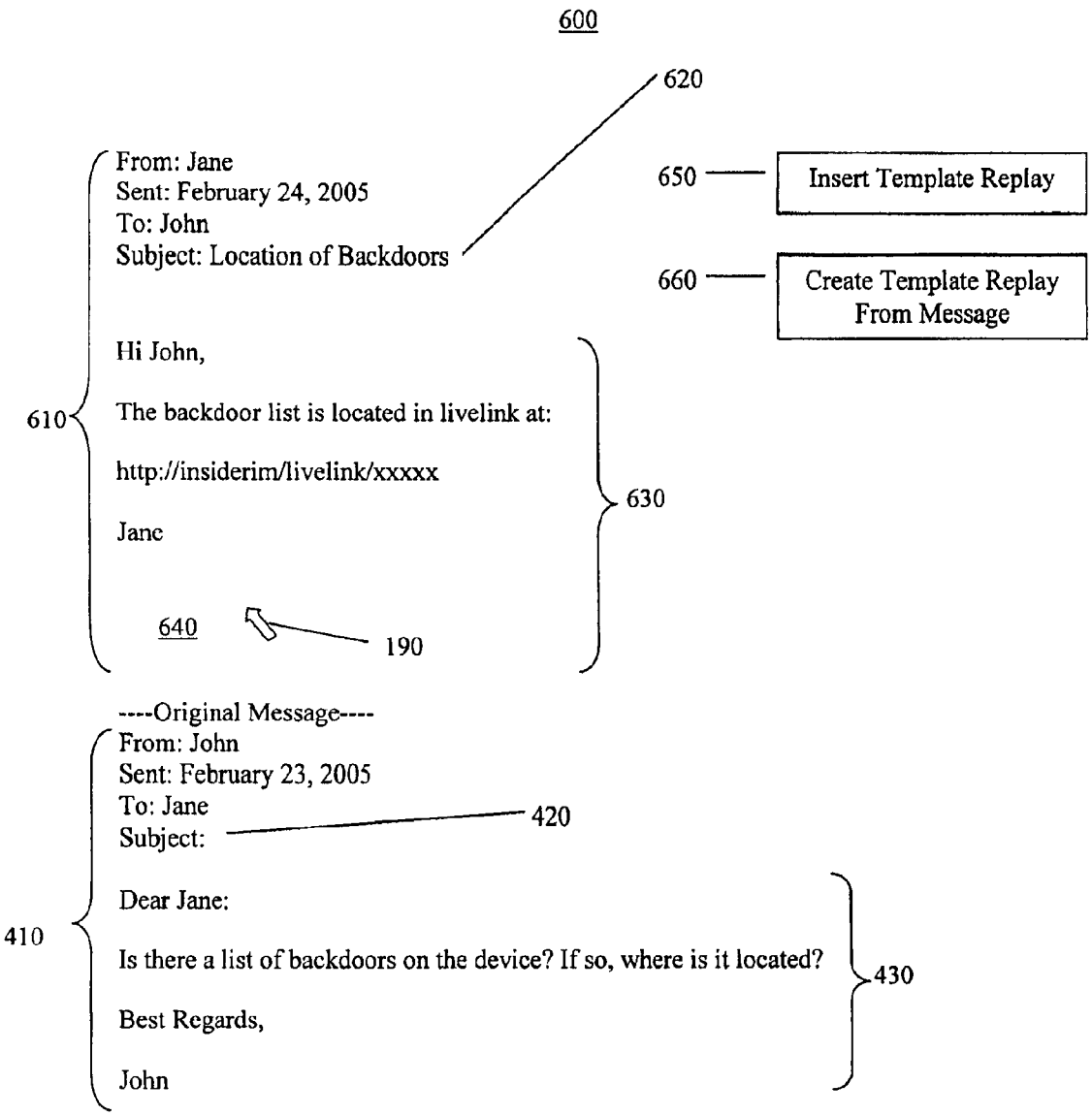
FIG. 6 is a partial screen capture illustrating a reply message to the email message of FIG. 4 generated using a template reply in accordance with an embodiment of the application.

FIG. 6 is a partial screen capture illustrating a reply message 600 to the email message 400 of FIG. 4 generated using a template reply 800 in accordance with an embodiment of the application. The content 610 of the reply message 600 includes a subject line 620, a body 630, and typically the content 410 of the original message 400. As will be described in more detail below, upon a user selecting the "Reply Using Template" menu item 510, the reply message 600 is generated by populating the subject line 620 and body 630 of the reply message 600 with content drawn from the template reply 800.

Figure 7:
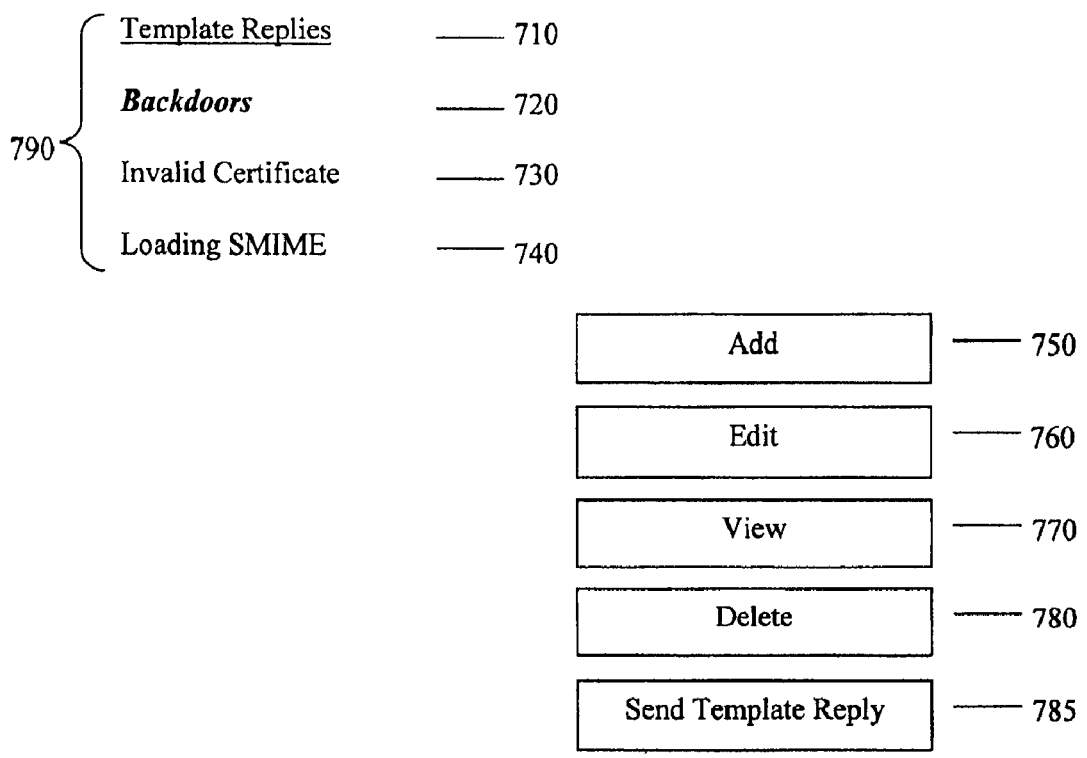
FIG. 7 is a partial screen capture illustrating a graphical user interface ("GUI") or screen for maintaining template replies for responding to email messages in accordance with an embodiment of the application.

FIG. 7 is a partial screen capture illustrating a graphical user interface ("GUI") 700 or screen for maintaining template replies 800 for responding to email messages in accordance with an embodiment of the application. The GUI 700 is displayed on the display screen 122, 140 of the wireless device 210 or data processing system 100 and may be incorporated in the GUI 180, 204 associated with email applications 170, 206 running on the wireless device 210 or data processing system 100.

The GUI 700 provides a list 790 of template reply titles (e.g., "Backdoors" 720, "Invalid Certificate" 730, "Loading SMIME" 740) which may be presented under a heading 710. In addition, the GUI 600 has menu items for adding a new template reply ("Add") 750, editing a template reply ("Edit") 760, viewing a template reply ("View") 770, deleting a template reply ("Delete") 780, and sending a template reply to other users ("Send Template Reply") 785. The menu items 750, 760, 770, 780 may appear in a pull-down or pop-up menu (not shown). According to one embodiment, the menu items 750, 760, 770, 780, 785 are buttons that may be presented within the GUI 700.

For example, a user may view the content of a template reply by selecting the title 720 of the template reply from the list 790 and choosing the "View" menu item 770. In FIG. 7, template reply title "Backdoors" 720 has been selected and as such it is shown in bold italic font.

As another example, a user may send a selected template reply to one or more selected recipients by choosing the "Send Template Reply" menu item 785.

FIG. 8 is a partial screen capture illustrating the content of an exemplary template reply 800 in accordance with an embodiment of the application. The template reply 800 shown in FIG. 8 corresponds to the template reply title "Backdoors" 720 which appears in the template reply list 790 of FIG. 7. The template reply 800 has a title 720, a subject 810, and a body 820. The title 720 uniquely identifies the template reply 800 and is displayed only to the user, typically in the GUI 700. The subject 810 is optional and when it is used its content is used for the subject line 620 of the reply message 600. The body 820 contains the main text or content of the template reply message 800. The content of the body 820 is inserted into the body 630 of the reply message 600 to complete that reply message.

According to one embodiment, the template reply 800 may include macros. For example if "% r" 830 is contained in the template reply body 820 it would be replaced by the recipient's name (e.g., "John") when the reply message 600 is created. Other examples of macros that could be used are include: "% d" for a date, "% t" for a time, "% o" for a wireless device owner's name, "% O" for a wireless device owner's information, "% p" for a wireless device owner's phone number, "% P" for a wireless device owner's personal identification number ("PIN"), etc.

In operation, when a user opens a message 400 on the display screen 122, 140 of the wireless device 210 or data processing system 100, software modules 206, 170 within the wireless device 210 or data processing system 100 perform operations to initiate the template replies application and present the GUI element 510 on the display screen 122, 140 of the wireless device 210 or data processing system 100. The GUI element 510, typically a menu item or button, is presented to the user for providing instructions to the wireless device 210 or data processing system 100 to reply to the message 400 using a template reply 800.

Thus, when viewing an opened email message 400, the user can click on a menu and select the "Reply Using Template" menu item 510. The user is then presented with a list of template replies 790 to choose from. After selecting a reply template title 720 from the list of template replies 790, a reply message 600 is generated which has the content 410 of the original message 400 at the bottom and has the content of the template reply body 820 on top as though the user had entered the template reply text by him or herself. If the template reply 800 contains a subject 810, then that subject 810 will form the content of the subject line 620 in the reply message 600. The user can then add any additional text to the reply message 600 that they wish before sending it.

A template reply 800 can be used at any time to generate a reply message 600 to an email message 400. According to one embodiment, a template reply 800 may be used to complete a reply message 600 that a user is currently composing.

Referring again to FIG. 6, when a reply message 600 is being composed by a user, an additional GUI element or menu item ("Insert Template Reply") 650 may be displayed on the display screen 122, 140 of the wireless device 210 or data processing system 100 and may be incorporated in the GUI 180, 204 associated with email applications 170, 206 running on the wireless device 210 or data processing system 100. The menu item 650 may appear in a pull-down or pop-up menu (not shown). According to one embodiment, the menu item 650 is a button that may be presented within the reply message 600.

The "Insert Template Reply" menu item 650 is provided for inserting the content of the body 820 of a template reply 800 into the body 630 of an open reply message 600 at a location 640 selected by the user with a pointing device 110 and cursor 190. The inserted content may form all or a part of the body 630 of the reply message 600. Thus, while entering body text 630 in an opened reply message 600 to the original email message 400, the user may insert additional body text from a template reply 800. The user can click on a menu and select the "Insert Template Reply" menu item 650. The user is then presented with a list 790 of template replies to choose from. After choosing a template reply 800 from the list, the body 820 of the template reply 800 is inserted into the current cursor location 640 in the reply message 600 that the user is composing. The user can then enter additional text, if desired, before sending the completed reply message.

Referring again to FIG. 8, a template reply can be created by a user in several ways. First, a user can create a template reply 800 from scratch at any time. To do this, the user enters the template reply application 170, 206 (which is typically an extension of the email messaging application), the maintenance GUI 700 is presented, and the user selects the "Add" menu item 750. A screen (not shown) having an empty template reply is then presented to the user for data entry (i.e., title, subject, body).

Second, when a message 400 is received and the user composes a reply message 600, the user can click on a menu item ("Create Template Reply From Message") 660 for creating a template reply 800 from the content of the body 630 of the reply message 600. The template replies application will then automatically create a template reply 800 using the content of the body 630 of the reply message 600 for the body 820 of the new template reply 800. The user is then prompted to enter a title 720 and a subject 810 and the new template reply 800 is saved. If the user does not enter a title 720 and a subject 810, then the title 720 and subject 810 can both default to the subject 620 of the reply message 600.

Third, a template reply 800 can be created from a sent message (not shown). When the user selects a sent item from the message list of their email application, the menu item "Create Template Reply From Message" 660, described above, can be presented for automatically creating a template reply 800 from the content of the subject and body of the sent message.

According to one embodiment, a template reply 800 can be emailed as an attachment to other users for their use in responding to FAQs.

According to another embodiment, the template reply application 170, 206 can keep track of how many times a template reply 800 is used in replies to email messages so that old or seldom used templates can be purged from the memory 130, 201 of the data processing system 100 or wireless device 210.

According to another embodiment, the email message 400 can be a peer-to-peer message ("PIN message"). A personal identification number ("PIN") is a number that is used to identify a wireless device 210 on a wireless network 220. Some wireless service providers allow for peer-to-peer messaging between wireless devices using PIN numbers as device addresses.

According to another embodiment, the email message 400 can be a Short Message Service ("SMS") message. Note that SMS messages are typically limited to 160 characters.

According to another embodiment, the template replies stored on the wireless device 210 are synchronized and updated via the wireless network with a host computer system such as the data processing system 100. Advantageously, the user can be assured that any changes made to the template replies on the data processing system 100 are reflected on the wireless device 210 and vice versa.

Advantageously, by using template replies users can save time and avoid sending tacky responses to FAQ emails.

Figure 9:
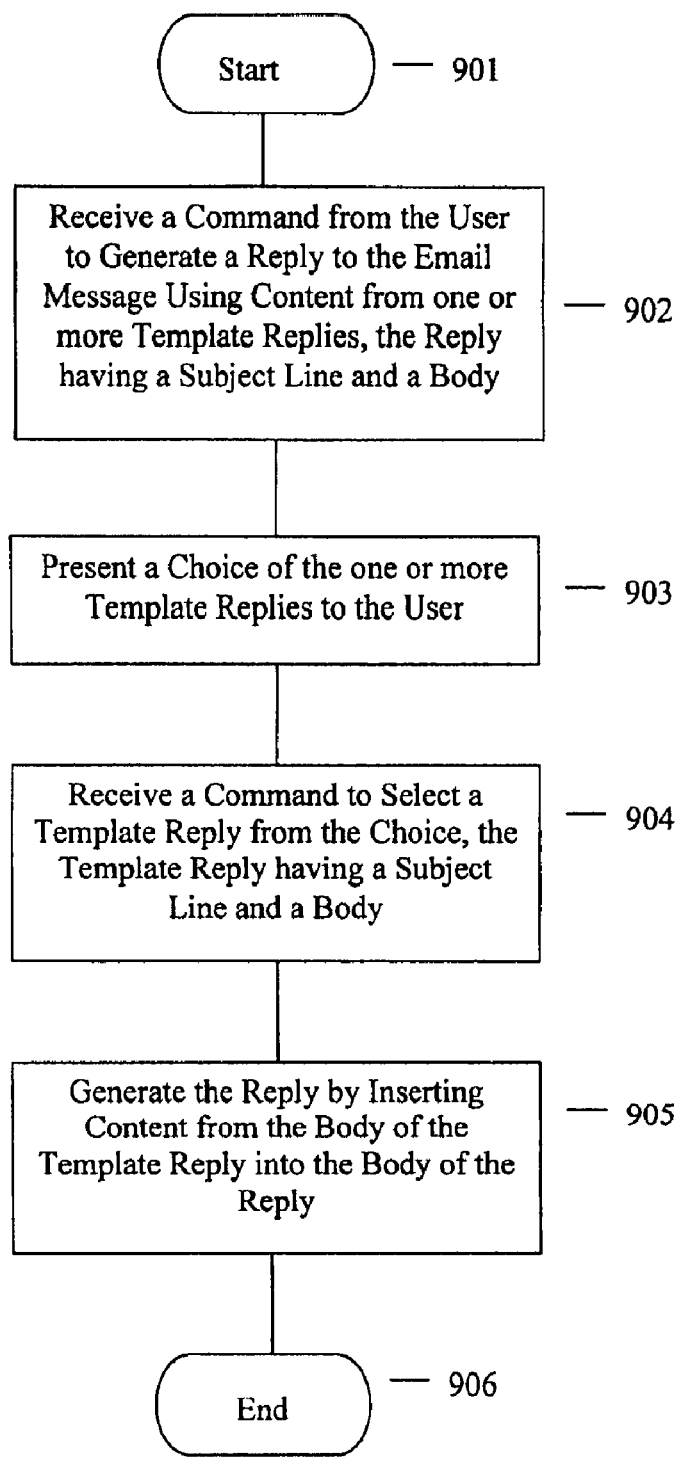
FIG. 9 is a flow chart illustrating operations of modules for responding to an electronic mail ("email") message presented to a user on a display screen of a data processing system in accordance with an embodiment of the application.

The above described method may be summarized with the aid of a flowchart. FIG. 9 is a flow chart illustrating operations 900 of modules 170 for responding to an electronic mail ("email") message 400 presented to a user on a display screen 140 of a data processing system 100 in accordance with an embodiment of the application.

At step 901, the operations 900 start.

At step 902, a command is received from the user to generate a reply 600 to the email message 400 using content from one or more template replies 800, the reply having a subject line 620 and a body 630.

At step 903, a choice 790 of the one or more template replies 800 is presented to the user.

At step 904, a command is received to select a template reply 800 from the choice 790, the template reply 800 having a subject line 810 and a body 820.

At step 905, the reply 600 is generated by inserting content from the body 820 of the template reply 800 into the body 630 of the reply 600.

At step 906, the operations 900 end.

Preferably, the generating 905 further comprises: if the subject line 810 of the template reply 800 is not empty, inserting content from the subject line 810 of the template reply 800 into the subject line 620 of the reply 600. Preferably, the method further includes presenting at least one of a menu item 510 and a button icon on the display screen 140 for selecting by the user to initiate the command to generate the reply 600. Preferably, the method further includes presenting the reply 600 on the display screen 140 for at least one of review by the user, editing, and sending. Preferably, the method further includes receiving a command from the user to modify the reply 600 by inserting content from a body of a second template reply at a location 640 in the body 630 of the reply 600 selected by the user, the second template reply selected by the user from the choice 790 of the one or more template replies. Preferably, the method further includes receiving a command from the user to at least one of edit 760, view 770, delete 780, and send a copy of 785 one or more of the template replies. Preferably, the method further includes receiving a command from the user to at least one of: add 750 a new template reply to the one or more template replies having content newly entered by the user; add 660 a new template reply to the one or more template replies having content copied from the reply 600; and add a new template reply to the one or more template replies having content copied from a sent reply. Preferably, the email message 400 is one of a short message system ("SMS") message and a peer-to-peer message. Preferably, the data processing system 100 is a wireless device 210 having a clickable thumbwheel 230. Preferably, the method further includes opening the email message 400 on the display screen 122, 140 when the email message 400 is selected from a list of email messages by the user with the clickable thumbwheel 230.

The above described method for responding to email messages is generally performed by the data processing system 100. However, according to an alternate embodiment of the application, the method can be performed by the wireless device 210.

While this application is primarily discussed as a method, a person of ordinary skill in the art will understand that the apparatus discussed above with reference to a wireless device 210 and a data processing system 100, may be programmed to enable the practice of the method of the application. Moreover, an article of manufacture for use with a wireless device 210 or data processing system 100, such as a pre-recorded storage device or other similar computer readable medium including program instructions recorded thereon, may direct the wireless device 210 or data processing system 100 to facilitate the practice of the method of the application. It is understood that such apparatus and articles of manufacture also come within the scope of the application.

The embodiments of the application described above are intended to be examples only. Those of skill in the art may effect alterations, modifications and variations to the particular embodiments without departing from the scope of the application. The subject matter described herein in the recited claims intends to cover and embrace all suitable changes in technology.

A portion of the disclosure of this patent document contains material which is subject to copyright protection. The copyright owner has no objection to the reproduction by any one of the patent document or patent disclosure, as it appears in the Patent and Trademark Office patent file or records, but otherwise reserves all copyrights whatsoever.

What is claimed is:

1. A method for creating a template for an electronic message on a wireless device, comprising:
   presenting a received electronic message on a display screen of the wireless device;
   receiving input corresponding to a composed reply to the received electronic message;
   presenting a selectable item on the display screen for initiating the creation a template reply from content of the body of the composed reply;
   creating the template reply in response to the selectable item being selected; and
   at least one of storing the created template reply on the wireless device and sending the created template reply to another wireless device.

2. The method of claim 1, further comprising displaying a prompt to enter at least one of a title and a subject for the created template reply.

3. The method of claim 2, further comprising, if at least one of the title and the subject are not received, setting at least one of the title and the subject to a subject of the composed reply.

4. The method of claim 1, wherein the created template reply comprises macros for at least one of a reply recipient's name, a date, a time and the wireless device owner's information, the macros to be replaced by the at least one of the reply recipient's name, the date, the time and the wireless device owner's information when the created template reply is used in responding to a future electronic message.

5. The method of claim 1, wherein the selectable item is one of a menu item and a button icon.

6. The method of claim 1, further comprising receiving a command to at least one of edit, view, delete, and send a copy of one or more selected template replies.

7. The method of claim 1, further comprising tracking the usage of each template reply and purging seldom used template replies.

8. The method of claim 1, further comprising synchronizing template replies on the wireless device with a host data process system via a wireless network.

9. The method of claim 1, wherein the received electronic message is one of a short message system 'SMS' message and a peer-to-peer message.

10. A wireless device adapted to create a template reply for an electronic message on the wireless device, comprising:
   a processor coupled to memory, a display screen, and an interface to a network, the processor adapted to:
      present a received electronic message on a display screen of the wireless device;
      receive input corresponding to a composed reply to the received electronic message;
      present a selectable item on the display screen for initiating the creation a template reply from content of the body of the composed reply;
      create the template reply in response to the selectable item being selected; and
      at least one of store the created template reply on the wireless device and send the created template reply to another wireless device.

11. The wireless device of claim 10, further adapted to display a prompt to enter at least one of a title and a subject for the created template reply.

12. The wireless device of claim 11, further adapted to, if at least one of the title and the subject are not received, set at least one of the title and the subject to a subject of the composed reply.

13. The wireless device of claim 10, wherein the created template reply comprises macros for at least one of a reply recipient's name, a date, a time and the wireless device owner's information, the macros to be replaced by the at least one of the reply recipient's name, the date, the time and the wireless device owner's information when the created template reply is used in responding to a future electronic message.

14. The wireless device of claim 10, wherein the selectable item is one of a menu item and a button icon.

15. The wireless device of claim 10, further adapted to receive a command to at least one of edit, view, delete, and send a copy of one or more selected template replies.

16. The wireless device of claim 10, further adapted to track the usage of each template reply and purging seldom used template replies.

17. The wireless device of claim 10, further adapted to synchronize template replies on the wireless device with a host data process system via a wireless network.

18. The wireless device of claim 10, wherein the received electronic message is one of a short message system 'SMS' message and a peer-to-peer message.

* * * * *

UNITED STATES PATENT AND TRADEMARK OFFICE
CERTIFICATE OF CORRECTION

PATENT NO.       : 8,103,735 B2                                               Page 1 of 1
APPLICATION NO.  : 13/212295
DATED            : January 24, 2012
INVENTOR(S)      : Neil Adams et al.

It is certified that error appears in the above-identified patent and that said Letters Patent is hereby corrected as shown below:

On the Title page (73) Assignee: replace "Research in Motion Limited" with
-- Research In Motion Limited --.

Signed and Sealed this
Sixth Day of November, 2012

David J. Kappos
*Director of the United States Patent and Trademark Office*